Aug. 18, 1931.      O. A. KNOPP      1,819,714
CALIBRATION SYSTEM
Filed Aug. 28, 1926

INVENTOR
Otto A. Knopp
BY John Flam
HIS ATTORNEY

Patented Aug. 18, 1931

1,819,714

UNITED STATES PATENT OFFICE

OTTO A. KNOPP, OF OAKLAND, CALIFORNIA

CALIBRATION SYSTEM

Application filed August 28, 1926. Serial No. 132,265.

This invention relates to a system for obtaining the calibrating curve of instrument transformers.

In connection with the measurement of such electrical quantities as potential difference, current, and power, it is now common to connect a measuring instrument of fixed, low range to any circuit, and to provide some form of variable multiplier to make the instrument adaptable for circuits having materially different characteristics. For example, when alternating current circuits are metered, instrument transformers can be used for adapting a low scale instrument to the circuit. More specifically, a current transformer can be used to reduce the current sent through an ammeter or through the current element of a wattmeter or watthourmeter, whereby an instrument of low range can be used, its readings being multiplied by the ratio of transformation of the transformer. Similarly, potential transformers are used for reducing the E. M. F. effective to influence a voltmeter or the potential elements of a wattmeter or watthourmeter.

It is obvious that in multirange transformers of this type, there are two independent variables—one, the electrical characteristic (such as current flow or E. M. F.) which is being reduced by the transformer; and the other, the ratio of transformation. So far as the ratio of transformation is concerned, the transformer windings can be so arranged that for different ratios of transformation the transformation error remains constant. The manner in which this is accomplished is fully explained in my former Patent No. 1,550,906, entitled "Instrument transformer" and issued August 25, 1925.

In order to secure this effect, the calibration curve is plotted in a distinctive manner. For example, for current transformers, the abscissæ are secondary ampere-turns, and the ordinates are percentages which the secondary ampere-turns differ from the primary ampere turns. For potential transformers, the abscissæ are secondary E. M. F.'s per turn, and the ordinates, the percentage which these secondary E. M. F.'s per turn differ from the primary E. M. F.'s per turn. It has been demonstrated in my patent referred to that these percentages do not vary with the ratio of transformation, provided the resistance of the active turns in the windings, vary as the square of these turns.

It is one of the objects of my invention to make it possible to obtain the points on such calibration curves in a simple and expeditious manner.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
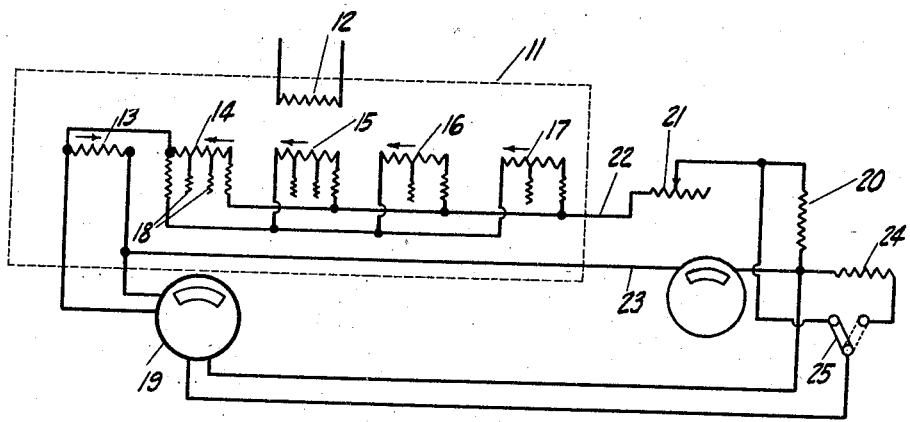
Figure 1 is a wiring diagram showing my invention in use in connection with a current transformer.

In Fig. 1, I show a current transformer 11 that is under test. This has a primary winding 12 of comparatively few turns, and a sectional secondary winding, made up of a plurality of coils, such as 13, 14, 15, 16, and 17. When the transformer is in use to reduce the current, the sections 13, 14, 15 and 17 are connected in series to form the secondary, and taps such as 18 are provided for varying the ratio of transformation. The sections 13, 14, 15, 16, and 17 have however the same number of turns, whereby some of them can be arranged in parallel, for practising my invention.

When calibrating the transformer 11, the primary winding 12 is left unconnected. The secondary winding 13—14—15—16—17 is split into two parts; to form a calibrating secondary, such as coil 13, and a calibrating primary, such as coils 14, 15, 16, and 17 in parallel. The ratio during test is thus 1:1. The calibrating curve however takes care of all ratios, since as pointed out in my prior patent, it is plotted between secondary ampere turns and the percentages that these values differ from the primary ampere turns. Preferably, the lowest resistance coil 13 is used for the secondary, to reduce the generation of heat and to keep the parts cool.

In order to obtain a direct reading of the errors, I arrange matters in such a way that the difference in current flow directly affects a measuring instrument, such for example as a testing wattmeter 19. For this purpose, the section 13 forming the calibrating secondary, is connected in series with the calibrating primary to a source 20. In order to vary the current flow to the transformer, a variable resistance 21 can also be included. The current element of instrument 19 is connected in parallel to the secondary 13. The current flow in conductor 22 must be the same as in conductor 23; and the ampere turns of coil 13 need only balance the ampere turns of primary 14—15—16—17; but since the primary carries the exciting current also, the current flow in the primary is larger than in the secondary, and produces the transformation error. This excess current finds a path through instrument 19, which thus measures the current error directly. Of course the calibrating primary and secondary must be connected in such relation, that the induced secondary current flows in the same direction as the current sent from the primary into the secondary. The wattmeter 19 has its potential element connected to a source of constant E. M. F., such as across the source 20. Indications of instrument 19 can be translated readily into transformation error. This can be appreciated from the following.

Due to the relation of the resistances in the secondary of the transformer 11 (which is such that it varies as the square of the number of active turns), calibrating only the first section 13 in this manner is sufficient to plot the calibration curve for all ratios. This is all carefully explained in the patent referred to. Assuming there are $n$ turns in the section 13, that the current in lines 22 and 23 is $I$, and that the current in coil 13 is $i$, which is less than $I$, the difference $I-i$, is the current in instrument 19. The ampere turn error is obviously $$\frac{nI-ni}{nI}$$

since the primary and secondary have the same number of turns. This reduces to $$\frac{I-i}{I}$$

which is equal to the current reading of instrument 19, divided by the current in lines 22 and 23; and represents the ordinate corresponding to the abscissa $ni$ of the calibration curve. Since a wattmeter 19 is used, indicating watts and not current, a factor must be introduced into the reading of this instrument to obtain this transformation error.

In the foregoing method, the phase difference between the secondary and primary currents is neglected, since it is obviously too small to have appreciable effect when the potential applied to wattmeter 19 is substantially in phase with the current. However, the phase angle itself can be determined by noting the reading of wattmeter 19 when its potential coil system is energized by an E. M. F. 90° displaced from that of source 20. This can be accomplished by providing a two phase source having a phase 24 in quadrature to that of phase 20. Switch 25 in the potential leads can be used to switch from one phase to the other. The reading of instrument 19 when phase 24 is used as the source for the potential system can readily be shown to be proportional to the wattless component of the secondary current; and from this value, the phase angle error can be calculated in well-known ways.

Of course, instrument 19 can be made to read directly in amperes if that is preferable to the more complex system disclosed. To calibrate the transformer, then, it is merely necessary to vary the current flow in leads 22 and 23, and to note the ratio of the amperes in instrument 19 and in lines 22 and 23.

Figure 3:
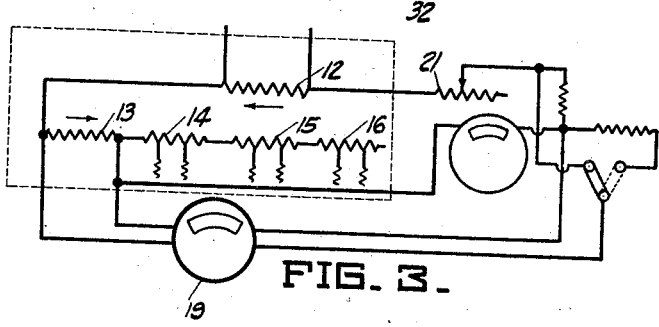
Fig. 3 is a wiring diagram showing a current transformer.

Instead of using two portions of the secondary winding for making the calibration tests, it is possible to utilize the primary 12 as one section. Such an arrangement is shown in Fig. 3, in which primary 12 and section 13 of the secondary form the series connected arrangement. In other respects this form is similar to Fig. 1.

Figure 2:
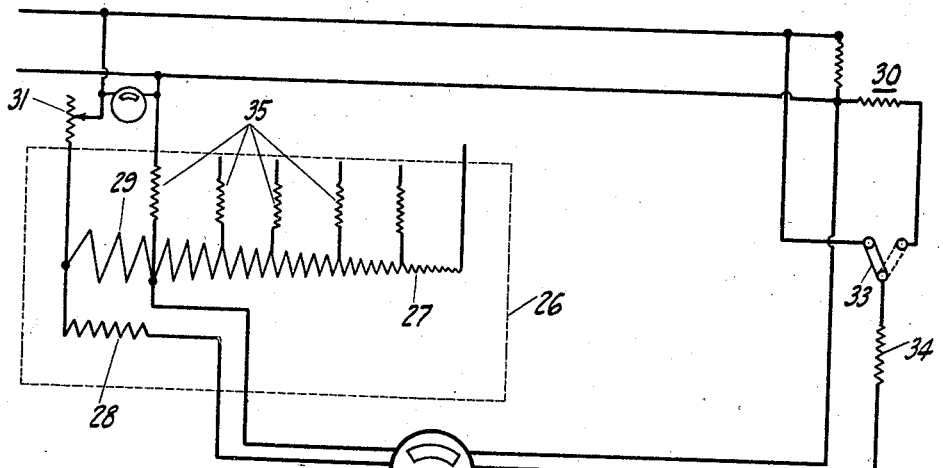
Fig. 2 is a wiring diagram showing my invention in use in connection with a potential transformer.

Substantially the same scheme of calibration can be used in connection with potential transformers. Thus in Fig. 2, I show a potential transformer 26 having a tapped primary 27 and a secondary 28. In this instance, the calibration curve is plotted between secondary E. M. F.'s per turn and the difference, in percent, between these E. M. F.'s and the corresponding primary E. M. F.'s per turn. Only a portion 29 of the transformer primary is used for calibrating (preferably the portion having least resistance), and the arrangement is such that the coils 28 and 29 have a 1 to 1 ratio. As before, a two-phase source 30 can be used; a variable resistance 31 is included in the primary circuit to vary the E. M. F. applied across coil 29. The potential system of a wattmeter 32 is connected in series with coils 29 and 28, which are in bucking relation, and it is thus evident that this instrument is thus responsive to the difference in the E. M. F.'s across the two coils. The current system of instrument 32 can be taken from either phase of the two phase source 30, by the aid of switch 33, the current being maintained constant by a resistance 34 in the circuit of the current system.

When the switch 33 is in the position shown, energizing instrument 32 from the same phase as transformer 26, the indications of instrument 32 are proportional to the error in transformation; and this error, divided by the primary E. M. F.'s per turn, can be plotted against secondary E. M. F.'s per turn. By varying resistance 31, any number of points on the curve can be obtained. Furthermore, as pointed out in my prior patent, resistances 35 in the leads of the primary 27, proportioned so that the resistance of the active portion of the primary varies as the square of the number of turns, ensure that the calibration curve obtained with the 1 to 1 ratio, is applicable to all other ratios.

When current is supplied to the current system of instrument 32 from the other phase of source 30, as by throwing switch 33 to the right, the indications of instrument 32 can be shown to be substantially proportional to the phase angle error.

I claim:

1. The method of calibrating instrument transformers in which there are a plurality of windings inductively associated, which comprises inducing in a winding that forms at least a part of the secondary of the transformer, a current flow by passage of a current in another winding having the same number of turns as the winding in which the current is induced, impressing upon one of the systems of a wattmeter, the difference between that electrical characteristic in these two windings which the transformer is designed to reduce, impressing upon the other system of the wattmeter a steady electrical current supplied from a source displaced 90° from the source to which the transformer is connected, and measuring the response of the wattmeter as well as that electrical characteristic of the inducing winding which forms the subject matter of the calibration.

2. The method of calibrating a current instrument transformer having a primary and a secondary winding, which comprises inducing a current in at least a portion of the secondary, by a ratio of transformation of one to one, connecting the induced winding in parallel with a measuring instrument, connecting the inducing winding which with the induced winding forms the one to one transformation system, in series with the induced winding, whereby the difference in the induced and the inducing current is caused to flow through the measuring instrument, and measuring the response of the measuring instrument as well as the current through the inducing winding.

3. In a calibrating system for a current instrument transformer having a primary and a secondary winding, a measuring instrument paralleling a portion only of the secondary winding, means connecting said portion in series with another portion of the transformer winding having the same number of turns as the secondary portion, and means for passing current through said portions of the winding in series, whereby the measuring instrument responds to the difference in the current flowing in the two windings.

4. In a calibrating system for an instrument transformer having a primary and a secondary winding, means for connecting a portion only of the secondary winding to another portion of the transformer winding which acts during calibration as the primary with the same number of turns as the portion of the secondary, and a measuring instrument connected to the said portions in such manner as to respond to the difference between that electrical characteristic in these two portions which the transformer is designed to reduce.

5. In a calibrating system for a multi-range instrument transformer having a primary and a secondary winding, one of said windings having a plurality of sections, means for connecting one section of said winding to another winding to form a system having a one-to-one ratio of transformation, and a measuring instrument connected to said system in such manner as to respond to the difference between the electrical characteristic in these windings forming the system, which characteristic the transformer is designed to reduce.

6. The combination as set forth in claim 5, in which the said winding having sections is so arranged that its resistance as the range of the transformer is varied, varies as the square of the number of turns, and in which the section chosen to form one of the windings of the one-to-one system is that which has the lowest resistance.

7. The combination as set forth in claim 5, in which said other winding that cooperates with the section of the winding to form a one-to-one system is formed by connecting the remaining sections in parallel.

In testimony whereof I have hereunto set my hand.

OTTO A. KNOPP.